(12) United States Patent
Kim

(10) Patent No.: US 12,283,917 B2
(45) Date of Patent: Apr. 22, 2025

(54) PHOTOVOLTAIC MODULE

(71) Applicant: SHANGRAO XINYUAN YUEDONG TECHNOLOGY DEVELOPMENT CO. LTD, Jiangxi Province (CN)

(72) Inventor: Joongtae Kim, Seoul (KR)

(73) Assignee: SHANGRAO XINYUAN YUEDONG TECHNOLOGY DEVELOPMENT CO. LTD, Jiangxi Province (CN)

( * ) Notice: Subject to any disclaimer, the term of this patent is extended or adjusted under 35 U.S.C. 154(b) by 586 days.

(21) Appl. No.: 17/262,462

(22) PCT Filed: Jun. 19, 2019

(86) PCT No.: PCT/KR2019/007396
§ 371 (c)(1),
(2) Date: Jan. 22, 2021

(87) PCT Pub. No.: WO2020/022648
PCT Pub. Date: Jan. 30, 2020

(65) Prior Publication Data
US 2021/0328545 A1 Oct. 21, 2021

(30) Foreign Application Priority Data
Jul. 25, 2018 (KR) ........................ 10-2018-0086628

(51) Int. Cl.
*H02S 40/34* (2014.01)
*H02G 3/08* (2006.01)

(52) U.S. Cl.
CPC ............... *H02S 40/34* (2014.12); *H02G 3/08* (2013.01)

(58) Field of Classification Search
None
See application file for complete search history.

(56) References Cited

U.S. PATENT DOCUMENTS

2006/0283628 A1* 12/2006 Feldmeier ............ H01R 12/592
174/260
2009/0272574 A1* 11/2009 Richter .............. H01R 13/5202
174/548

(Continued)

FOREIGN PATENT DOCUMENTS

DE 202007006007 U1 * 8/2007 ............. H02G 3/088
JP 2012-49460 A 3/2012

(Continued)

OTHER PUBLICATIONS

Machine translation of WO2006/074561A1 (Year: 2006).*
Machine translation of 202007006007U1 (Year: 2007).*
Machine translation of KR20150133594A (Year: A).*

*Primary Examiner* — Ryan S Cannon
(74) *Attorney, Agent, or Firm* — Tarolli, Sundheim, Covell & Tummino LLP

(57) ABSTRACT

A photovoltaic module according to one embodiment of the present invention comprises: a photovoltaic panel; and a junction box electrically connected to the photovoltaic panel and mounted on the rear side of the photovoltaic panel. The junction box comprises: a circuit unit including a circuit board; a case accommodating the circuit unit and having a remaining empty space; and an air discharge member mounted on the case, for allowing air flow inside and outside the case.

7 Claims, 6 Drawing Sheets

(56) References Cited

U.S. PATENT DOCUMENTS

| | | | | |
|---|---|---|---|---|
| 2010/0093231 A1* | 4/2010 | Lauermann | ............ | H02G 3/088 |
| | | | | 439/852 |
| 2010/0182761 A1 | 7/2010 | Suzuki et al. | | |
| 2011/0275305 A1* | 11/2011 | Egersdoerfer | ......... | B65D 90/34 |
| | | | | 454/339 |
| 2012/0024558 A1* | 2/2012 | Lin | ........................ | H02G 3/088 |
| | | | | 174/50 |
| 2012/0048871 A1* | 3/2012 | Chiu | .................... | H05K 5/0216 |
| | | | | 220/745 |
| 2012/0168453 A1* | 7/2012 | Chiu | .................... | H05K 5/0216 |
| | | | | 220/745 |
| 2018/0138857 A1* | 5/2018 | Davies | .................... | H02S 40/34 |
| 2020/0381905 A1* | 12/2020 | Sasaki | ................. | B60R 16/0238 |

FOREIGN PATENT DOCUMENTS

| | | | |
|---|---|---|---|
| JP | 2012-104516 A | 5/2012 | |
| KR | 10-2012-0104874 A | 9/2012 | |
| KR | 10-2015-0133594 A | 11/2015 | |
| WO | WO-2006074561 A1 * | 7/2006 | ............. H02S 40/34 |

* cited by examiner

[Fig. 1]
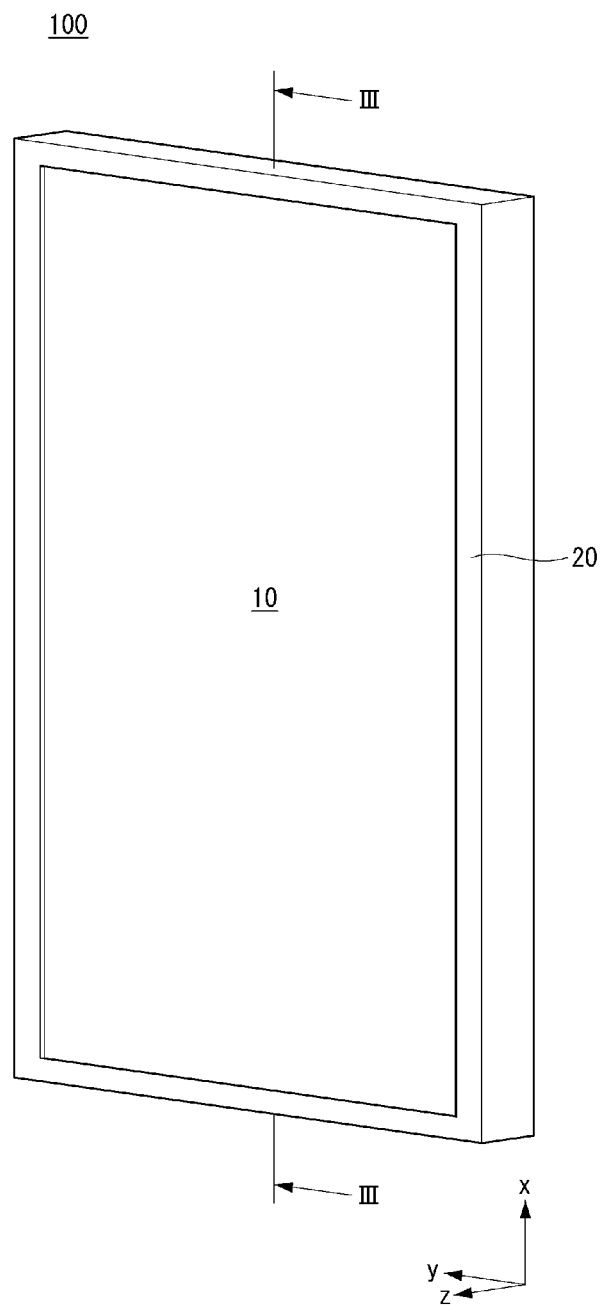

[Fig. 2]
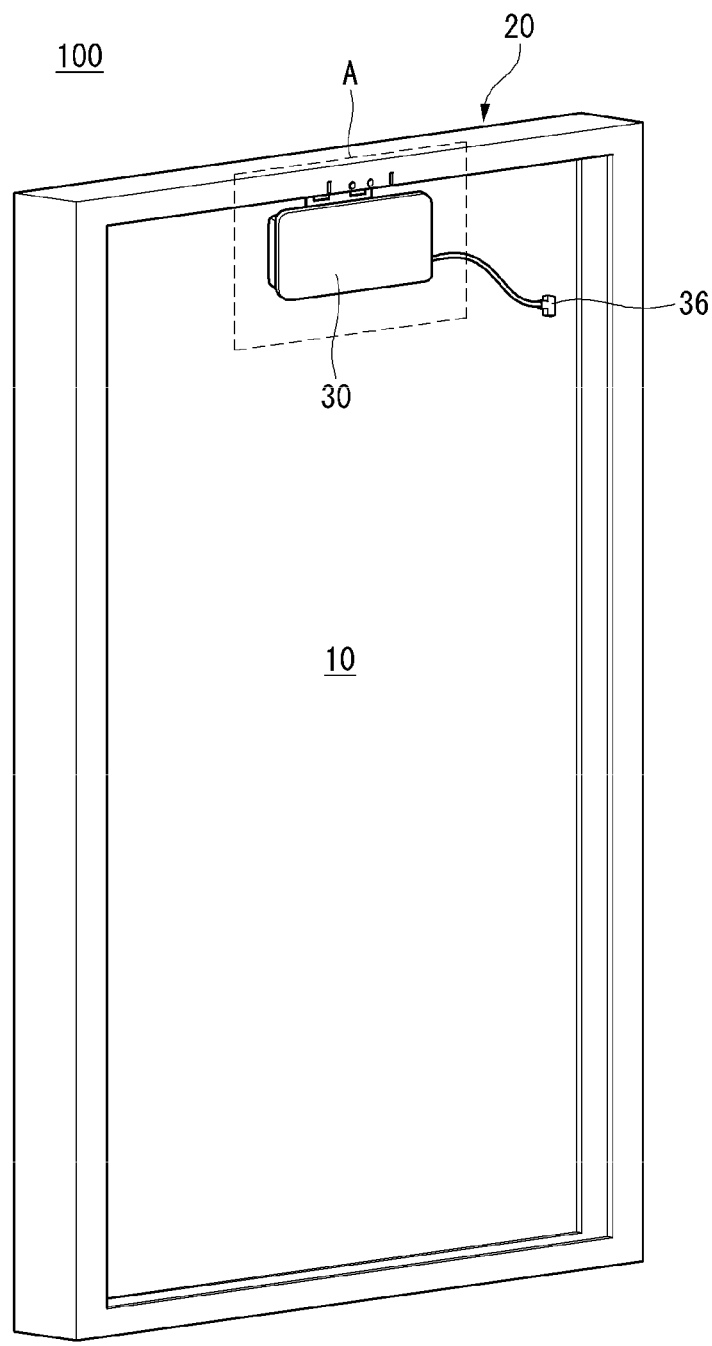

[Fig. 3]
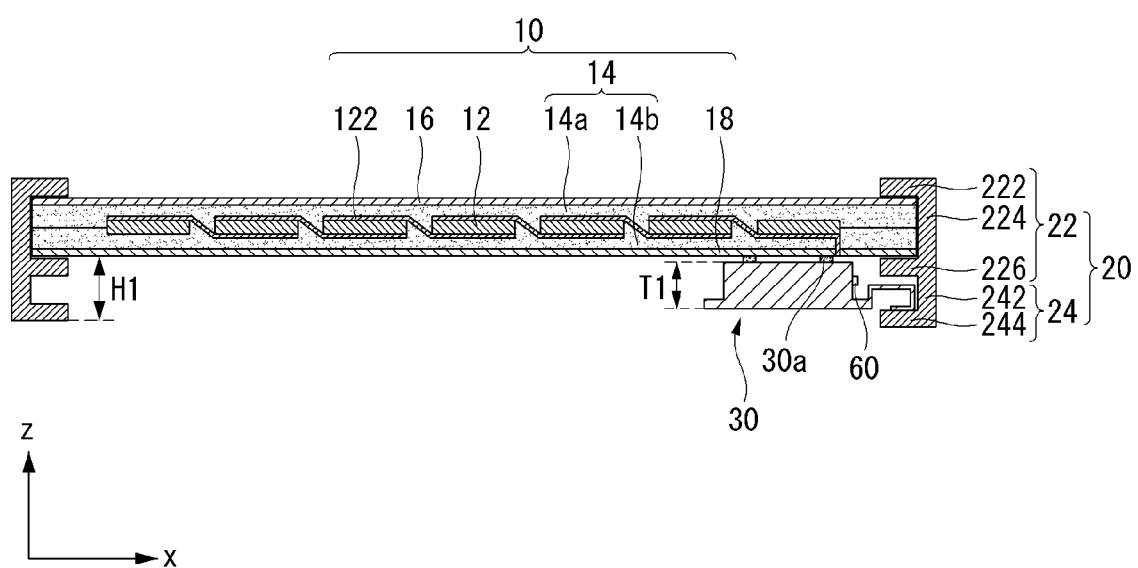

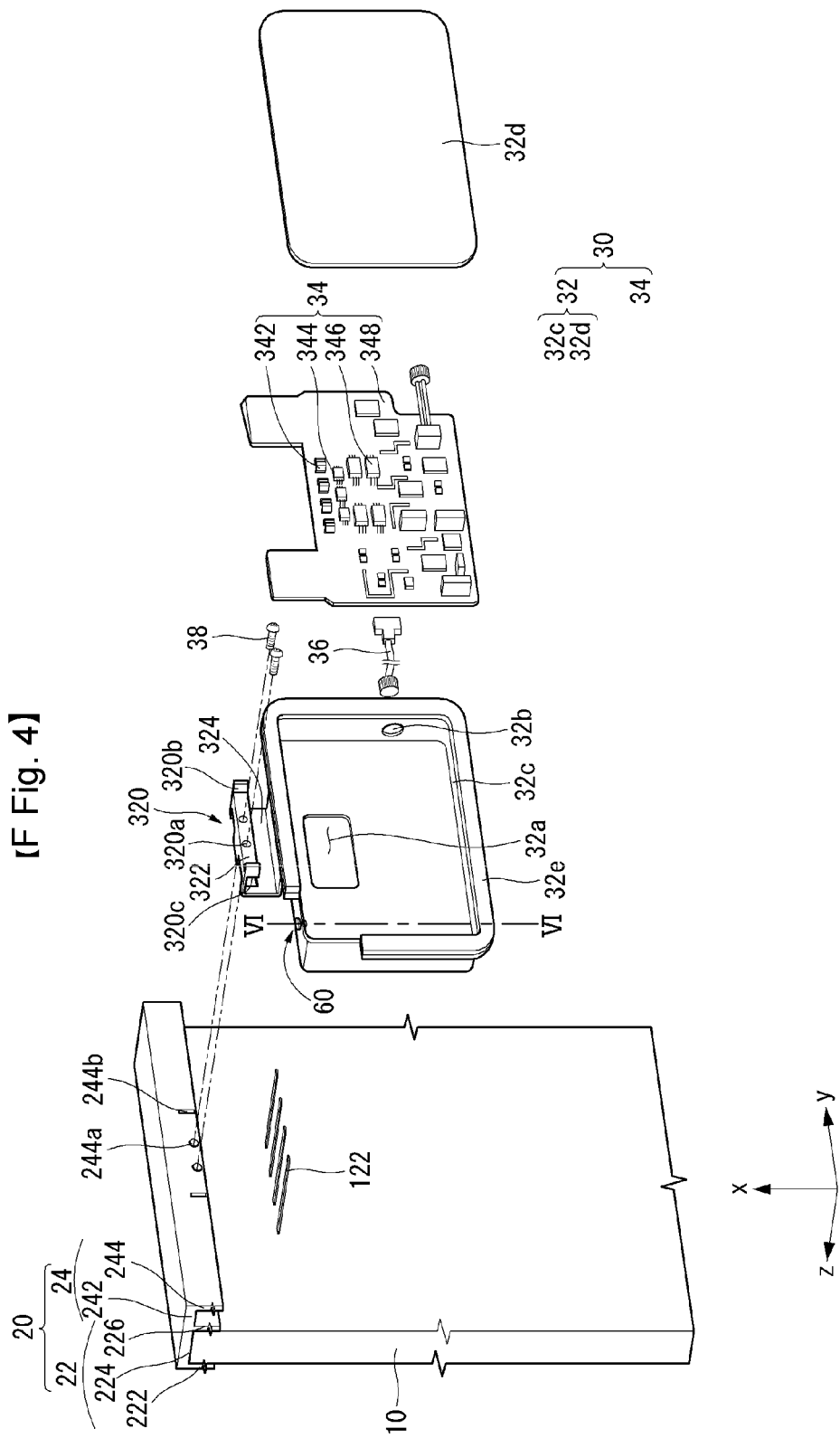
[F Fig. 4]

[Fig. 5]
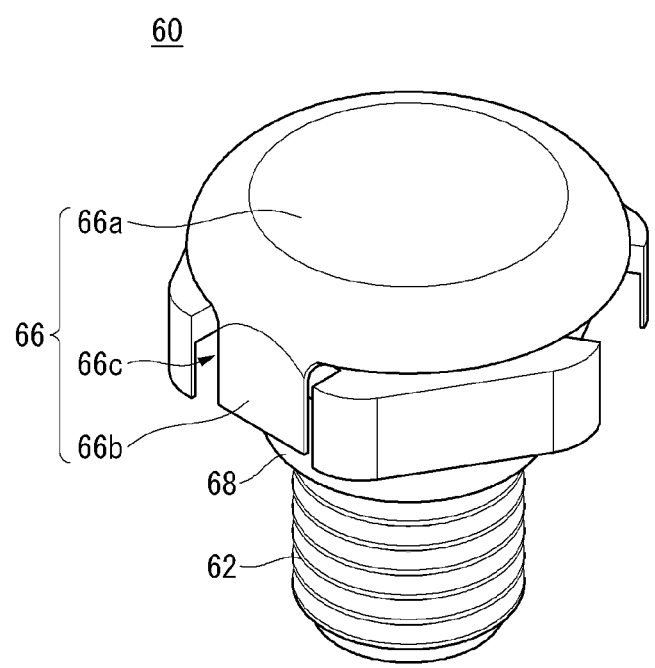

【Fig. 6】
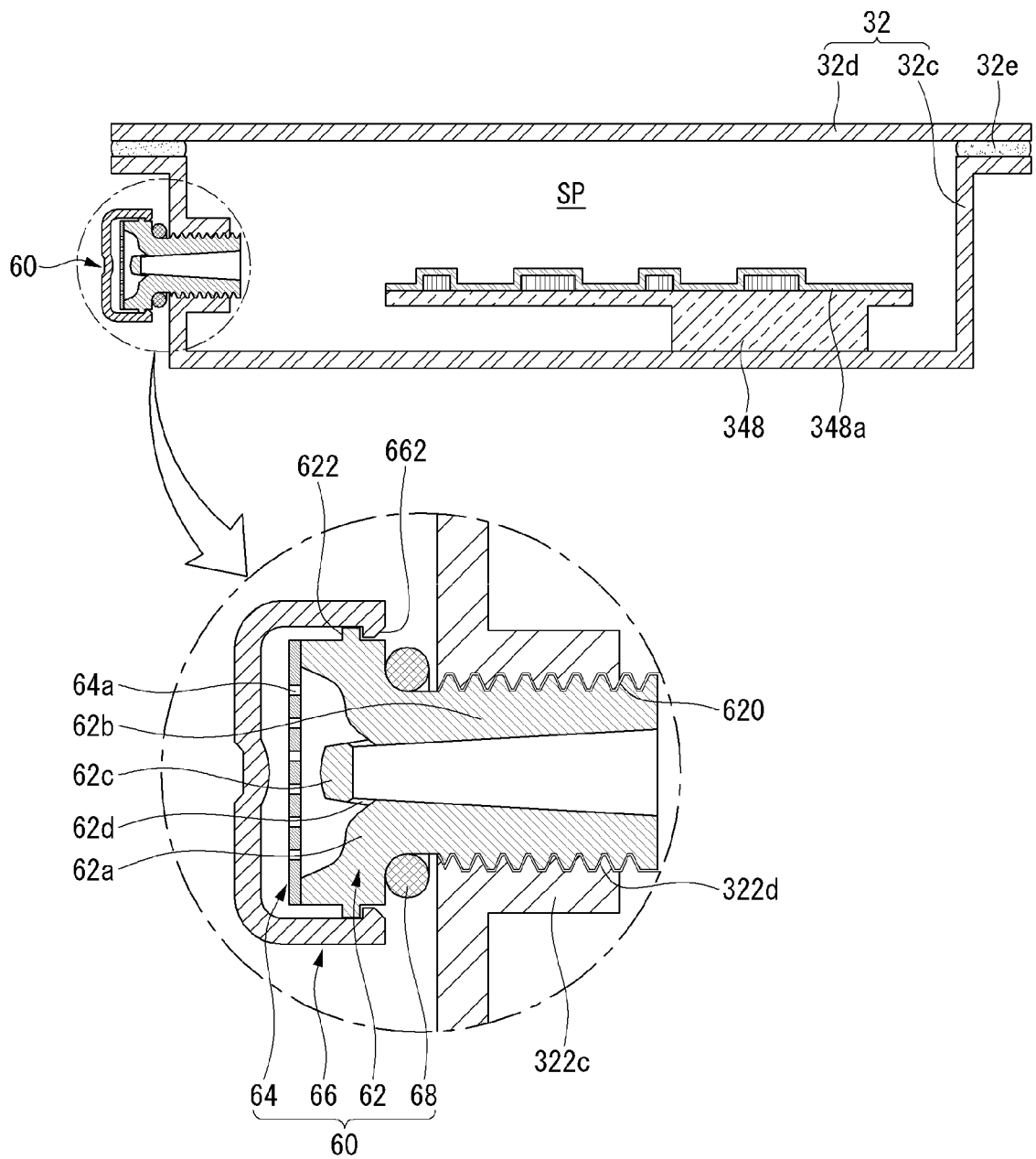

PHOTOVOLTAIC MODULE

CROSS REFERENCE TO RELATED APPLICATIONS

This application is the National Phase of PCT International Application No. PCT/KR2019/007396, filed on Jun. 19, 2019, which claims priority under 35 U.S.C. 119 (a) to Korean Patent Application No. 10-2018-0086628, filed in Republic of Korea on Jul. 25, 2018, all of these applications being hereby expressly incorporated by reference into the present application.

TECHNICAL FIELD

The present disclosure relates to a solar cell module and, more particularly, to a solar cell module with an improved structure.

BACKGROUND ART

A solar cell module may include a solar cell panel including a solar cell, and a distributing box including components, a circuit, and the like connected to the solar cell panel. An empty space inside the distributing box has conventionally completely been filled with a potting material so that the inside of the distributing box is free from air to improve sealing and insulation properties and protects the components, the circuit, and the like positioned inside the distributing box. Particularly, such a method has mainly been used in a distributing box including a circuit board to protect and insulate the circuit board.

However, if the entire empty space inside the distributing box is filled with the potting material, weight of the distributing box may increase. Furthermore, a lot of time may be required in manufacturing of the distributing box as a time for filling and coagulating the potting material is required, and productivity may be deteriorated as a structure for filling the potting material in the distributing box should be equipped. Moreover, productivity may be further deteriorated as manufacturing costs increase to satisfy properties such as flame retardancy required when the distributing box is filled with the potting material on the whole.

DISCLOSURE

Technical Problem

The present disclosure provides a solar cell module capable of reducing weight and improving productivity by having a residual empty space in which air may be positioned inside the distributing box.

Particularly, the present disclosure provides a solar cell module which can reduce weight of the distributing box as the inside of the distributing box is not filled with the potting material, and which can improve productivity by reducing or omitting structure, costs, process, and the like for the purpose of reducing the weight of the distributing box.

Technical Solution

A solar cell module according to an embodiment of the present disclosure may include a distributing box including an air discharge member enabling air flow inside and outside a case. More specifically, the distributing box may be electrically connected to a solar cell panel and mounted on the rear side of the solar cell panel. At this time, the distributing box may include a circuit unit including a circuit board, and a case accommodating the circuit unit and having a residual empty space, and the air discharge member may be formed or mounted on the case.

The air discharge member may block supply of water while enabling air to flow by including a membrane having pores.

The air discharge member may include a fixing unit fixed to the case, the membrane mounted on a portion of the fixing unit which is positioned outside the case, and a cover unit fixed to the fixing unit to have an air flow path in a state that the membrane is formed between the cover unit and the fixing unit.

The case may include a fastening part that is protruded inwardly while including a through-hole through which the fixing unit passes. The fixing unit may include a fixing part which has a larger size than the through-hole, is positioned on an outer portion of the case, and has a central hole, and an extension part which is extended to the inside of the case by passing through the through-hole. An engagement structure, which is engaged with an inner surface of the through-hole and an outer surface of the extension part, may be formed.

A cap unit covering the end portion of the extension part may be provided so that an air outlet is formed in an end portion of the extension part adjacent to the fixing part.

A close contact member positioned between the case and the fixing unit may be further included.

The air discharge member may be fixed from the side of the case to an upper end portion thereof.

The distributing box may further include an insulation coating layer positioned on the circuit board.

The insulation coating layer may have a thickness of 1 mm or less.

The insulation coating layer may comprise an epoxy resin or a silicone resin.

Advantageous Effects

According to the present embodiment, a process of filling the distributing box with a potting material after fastening or assembling a circuit, components, and the like to the inside of a distributing box is omitted so that a residual empty space in which air may be positioned is provided inside the distributing box. Accordingly, productivity can be greatly improved by enabling weight of the distributing box to be reduced, omitting a process of filling the potting material, a process of coagulating the potting material, and other processes, enabling a structure for enabling the weight of the distributing box to be reduced, and omitting the filling process, coagulation process, and other processes to be removed from the distributing box. At this time, the circuit board is stably protected, and desired insulation properties can be satisfied by forming an insulation coating layer on the surface of the circuit board when a circuit board is positioned inside the distributing box.

Furthermore, the distributing box can be prevented from being undesirably deformed by expansion of air as air of a residual empty space inside the distributing box is discharged by an air discharge member although temperature of the distributing box is increased during the operation of a solar cell module or a distributing box. The air discharge member can prevent an external moisture from flowing into the inside of the distributing box while the flow of air inside and outside the distributing box is not being obstructed. Here, the air discharge member can simplify a fastening structure and process by having a screw type structure capable of being easily fastened to the case of the distributing box so that a fastening structure such as a separate nut or the like is not necessary.

DESCRIPTION OF DRAWINGS

FIG. 1 is a front perspective view illustrating a solar cell module according to an embodiment of the present disclosure.

FIG. 2 is a rear perspective view illustrating the solar cell module of FIG. 1.

FIG. 3 is a schematic cross-sectional view taken along line III-III of FIG. 1.

FIG. 4 is an exploded perspective view which illustrates the exploded A portion by expanding an A portion of FIG. 2, and illustrates the cut portions thereof by cutting portions of a first case unit and an adhesion part.

FIG. 5 is a schematic perspective view illustrating the expanded air discharge member by expanding an air discharge member illustrated in FIG. 4.

FIG. 6 is a cross-sectional view schematically illustrating the cut line VI-VI by cutting along line VI-VI of FIG. 4.

MODE OF DISCLOSURE

Hereinafter, embodiments of the present disclosure will be described in detail with reference to the accompanying drawings. However, the present disclosure is not limited to these embodiments, and may be modified into various forms.

Illustration of a part having no relationship with the description is omitted to clearly and simply describe the present disclosure in the drawings, and identical or extremely similar constituent elements are indicated by identical reference numeral throughout the specification. Since thickness, area, and the like have been illustrated to be expanded or contracted to describe the present disclosure more clearly in the drawings, the thickness, area, and the like of the present disclosure are not limited to those illustrated in the drawings.

Also, throughout the specification, when a part is referred to as "including" an element, other elements may be further included not excluded unless there is any other particular mention about it. Furthermore, when a portion of a layer, film, region, plate or others is referred to as being "on" the other portion thereof, it may be "directly on" the other portion thereof, or another portion may also be interposed therebetween. When the portion of the layer, film, region, plate or others is referred to as being "directly on" the other portion thereof, this means that another portion is not interposed therebetween.

Hereinafter, a solar cell module according to an embodiment of the present disclosure will be described in detail with reference to the accompanying drawings.

FIG. 1 is a front perspective view illustrating a solar cell module 100 according to an embodiment of the present disclosure, FIG. 2 is a rear perspective view illustrating the solar cell module 100 of FIG. 1, and FIG. 3 is a schematic cross-sectional view taken along line III-III of FIG. 1. For reference, a distributing box 30 has been schematically illustrated in FIG. 3, and the distributing box will be illustrated later in more detail with reference to FIGS. 4 to 6.

Referring to FIGS. 1 to 3, a solar cell module 100 according to the present embodiment includes a solar cell panel 10 including a solar cell 12, and a distributing box 30 electrically connected to the solar cell panel 10 and mounted on the rear side of the solar cell panel 10. Here, the distributing box 30 includes a circuit unit (a reference numeral 34 of FIG. 4, the same as below) including a circuit board (a reference numeral 348 of FIG. 4, the same as below), a case (a reference numeral 32 of FIG. 4, the same as below) accommodating the circuit unit 34 and having a residual empty space (a reference numeral SP of FIG. 6, the same as below), and an air discharge member 60 mounted on the case 32 to enable air to flow inside and outside the case 32. In addition, the solar cell module 100 may further include a frame 20 fixing an outer peripheral portion of the solar cell panel 10, and a sealing member (not shown in the drawings) sealing and bonding the solar cell panel 10 and the frame 20 may be positioned between the solar cell panel 10 and a frame 20.

A solar cell panel 10 according to the present embodiment includes at least a solar cell 12, and may include a front member 16 positioned in front of the solar cell 12, a rear member 18 positioned in rear of the solar cell 12, and a sealing material 14 positioned between the front member 16 and the rear member 18 while surrounding the solar cell 12.

As an example, the solar cell 12 may include a semiconductor substrate (for example, a single crystalline semiconductor substrate, more specifically, a single crystalline silicon wafer), first and second conductive regions which are formed on or above the semiconductor substrate and have conductivity types that are opposed to each other, and first and second electrodes which are connected to the first and second conductive regions respectively. Here, the semiconductor substrate may include a p-type or n-type semiconductor substrate with a low doping concentration, one of the first and second conductive regions may include a p-type conductive region, and the other of the first and second conductive regions may include a n-type conductive region. Also, the first or second conductive region may be comprised of a doping region formed by doping a portion of the semiconductor substrate with a dopant, and may be comprised of a semiconductor layer which is separately formed on the semiconductor substrate and has the dopant doped thereon. Also, a plurality of solar cells 12 are provided, and a first electrode of the solar cells 12 and a second electrode of the solar cells 12 adjacent to the first electrode are connected by a conductive connection material 122 so that a solar cell string in which the plurality of solar cells 12 form a row may be formed. Various known structures may be applied as a structure of the solar cell 12, a connecting structure of the plurality of solar cells 12, and the like. Various members including a ribbon, an interconnector, and the like may be applied as the conductive connection material 122. In addition, one or a plurality of solar cell strings may be included in the solar cell panel 10.

The present embodiment has exemplified that a silicon single crystalline semiconductor solar cell is used as the solar cell 12 accordingly. However, the present disclosure is not limited thereto, and solar cells with various structures such as a thin-film solar cell, a dye-sensitized solar cell, a tandem-type solar cell, a compound-semiconductor solar cell, and the like may be used as the solar cell 12. Furthermore, although it has been exemplified that a plurality of solar cells 12 are provided, it may be possible that only one of the solar cells 12 is provided.

A front member 16 is positioned on a sealing material 14 (for example, a first sealing material 14*a*) to form a front surface of a solar cell panel 10, and a rear member 18 is positioned on the sealing material 14 (for example, a second sealing material 14*b*) to form a rear surface of the solar cell panel 10. The front member 16 and rear member 18, as layers of protecting the solar cells 12 in front and rear of the solar cells 12, perform waterproofing, insulation, and UV blocking functions.

For example, the front member 16 may be a glass substrate which is excellent in durability, insulation properties, damp proof properties, light permeability, and the like. The rear member 18 may have a form of a film, a sheet, or the like. For example, the rear member 18 may include a base member, and a resin layer formed on at least one surface of the base member. At this time, the rear member 18 may be a TPT (Tedlar/PET/Tedlar) type rear member, or may be comprised of a polyvinylidene fluoride (PVDF) resin or the like formed on at least one surface of polyethylene terephthalate (PET). Since the PVDF resin, as a polymer having a structure of $(CH_2CF_2)_n$, has a double fluorine molecular structure, the PVDF resin is excellent in mechanical properties, weatherability, and ultraviolet resistance. However, the present disclosure is not limited to material or the like of the rear member 18.

The sealing material 14 prevents water and oxygen from flowing into the solar cells 12, and chemically bonds respective elements of the solar cell panel 10. The sealing material 14 comprises an insulating material having optical transmittance and adhesive properties as a base material. In the present specification, the base material means a material contained in each of layers at the highest weight percent. For example, the sealing material 14 may consist of an ethylene vinyl acetate (EVA) resin, a polyvinyl butyral resin, a silicon resin, an ester-based resin, an olefin-based resin, a polyethylene-based resin, an ionomer, and the like.

A frame 20 to which an outer peripheral portion of the solar cell panel 10 is fixed may be positioned to stably fix a solar cell panel 10 comprised of a plurality of layers as stated above. The frame 20 is formed along the edge of the solar cell panel 10 so that the frame 20 can protect the outer peripheral portion of the solar cell panel 10.

In the present embodiment, the frame 20 may include a panel insertion unit 22 into which at least a portion of the solar cell panel 10 is inserted, and an extension unit 24 which is extended toward the outside from the panel insertion unit 22. The extension unit 24 is a part which increases strength of the frame 20, and is fixed to a stand, a supporter, a floor surface, and the like. If the panel insertion unit 22 and the extension unit 24 are provided accordingly, the solar cell panel 10 is prevented from being damaged when installing a solar cell module 100.

More specifically, the panel insertion unit 22 enables the outer peripheral portion of the solar cell panel 10 to be positioned on an inner portion thereof by connecting a front part 222 positioned in front of the solar cell panel 10, a side part 224 positioned in the side of the solar cell panel 10, and a rear part 226 positioned in rear of the solar cell panel 10 to each other. For example, the panel insertion unit 22 is bent twice to have a "⊏" or "U" character cross-sectional shape allowing the edge of the solar cell panel 10 to be positioned on an inner portion of the panel insertion unit 22. However, the present disclosure is not limited thereto, and any one or some of the front part 222, side part 224, and rear part 226 may not be positioned. In addition, various modifications can be made.

The extension unit 24 extending rearward from the panel insertion unit 22 may include a first part 242 which extends rearward from the panel insertion unit 22 and formed in parallel to the side part 224 (or formed on the same plane as the side part 224), a second part 244 which is bent and extended toward the inside from the first part 242 so that the second part 244 is positioned at predetermined intervals from the rear surface of the solar cell panel 10 or the rear part 226. The second part 244 may be formed to be parallel to the rear surface of the solar cell panel 10 or the rear part 226 or to be inclined thereto. Accordingly, the extension unit 24 is bent and formed once so that the extension unit 24 may have a "⌐" or "L" character cross-sectional shape forming a space between the extension unit 24 and the rear part 226.

Furthermore, a distributing box 30 positioned on the rear surface of the solar cell panel 10 and electrically connected to the solar cells 12 may include various components, members, circuits, and the like for transferring electrical energy generated by the solar cell panel 10 to the outside. Such a distributing box 30 may be attached to the solar cell panel 10 by an adhesion member 30a.

For example, the distributing box 30 may be positioned on the rear surface of the solar cell panel 10, and may be positioned adjacently to an upper end portion of the solar cell panel 10. At this time, the sum of thickness T1 of the distributing box 30 and thickness of a solar cell adhesion member 30a may be smaller than a height H1 (more specifically, height of the first part 242) of the extension unit 24. In addition, the thickness T1 of the distributing box 30 may be smaller than the height H1 of the extension unit 24. Here, the height H1 of the extension unit 24 may be defined as a distance from the rear surface of the solar cell panel 10 to an outer surface of the second part 244 of the extension unit 24. Accordingly, the distributing box 30 may be positioned so that the distributing box 30 does not protrude from an outer surface of the second part 244. That is, the rear surface (a surface positioned away from the solar cell panel 10) of the distributing box 30 may be positioned on the same plane as the outer surface of the second part 244, or positioned closer to the solar cell panel 10 than the outer surface of the second part 244. Therefore, the volume of the solar cell module 100 may be minimized, and a space toward the rear side of the solar cell panel 10 may be efficiently utilized.

At this time, the distributing box 30 may be coupled to the extension unit 24 in the present embodiment by positioning a portion of the distributing box 30 on an inner portion of the extension unit 24 of the frame 20 adjacent to an upper end portion of the solar cell panel 10. At this time, a portion of the distributing box 30 may be easily positioned on the inner portion of the extension unit 24 by positioning the distributing box 30 so that the rear surface of the distributing box 30 is on the same line as an inner surface of the second part 244, or is closer to the solar cell panel 10 than the inner surface of the second part 244 in a part of the distributing box 30 positioned on the inner portion of the extension unit 24. This will be described later in more detail.

In the present embodiment, a distributing box 30 including a circuit board 348 may include an air discharge member 60 while including a residual empty space SP. This will be described in detail by referring to FIGS. 4 to 6 along with FIGS. 1 to 3.

FIG. 4 is an exploded perspective view which illustrates the exploded A portion by expanding an A portion of FIG. 2, and illustrates the cut portions thereof by cutting portions of a first case unit 32c and an adhesion part 32e. FIG. 5 is a schematic perspective view illustrating the expanded air discharge member by expanding an air discharge member 60 illustrated in FIG. 4, and FIG. 6 is a cross-sectional view schematically illustrating the cut line VI-VI by cutting along line VI-VI of FIG. 4. An insulation coating layer 348a has not been illustrated in FIG. 4 for the purpose of simple illustration.

Referring to FIGS. 4 to 6, the distributing box 30 in the present embodiment includes a case 32 having an internal space, and may include a circuit unit 34 which is positioned inside the case 32 to operate the distributing box 30. For example, the circuit unit 34 may include a circuit board 348, and the internal space of the case 32 may include a residual empty space SP which is positioned besides a part having the circuit unit 34 positioned therein.

In the drawings, the case 32 includes first and second case units 32c and 32d so that it can be possible to put the circuit unit 34 into or take the circuit unit 34 from an internal space unit formed by the first and second case units 32c and 32d in a state in which the first and second case units 32c and 32d are separated, and the circuit unit 34 may be stably accommodated in the internal space unit in a state that the first and second case units 32c and 32d are assembled.

For example, the first case unit 32c is a part which is positioned adjacently to the rear surface of the solar cell panel 10 and has an internal accommodation space while having a bottom surface, and may have a flat shape so that the second case unit 32d covers the internal accommodation space. However, the present disclosure is not limited thereto, and the opposite is also possible. The first and second case units 32c and 32d may be bonded to each other by the adhesion part 32e positioned between the first and second case units 32c and 32d in a portion where the first and second case units 32c and 32d are in contact with each other (for example, a flange portion). In that case, the first and second case units 32c and 32d are closely contacted and adhered to each other by the adhesion part 32e so that the residual empty space SP of the case 32 can be stably sealed. Instead, an air discharge member 60 connecting the residual empty space SP and the outside is positioned in the present embodiment so that air, dust, and the like can be blocked while allowing air to flow, and this will be described later in more detail. The adhesion part 32e may include various materials having bonding and/or sealing properties, and may include, for example, a sealant or the like. However, the present disclosure is not limited thereto. Therefore, the first and second case units 32c and 32d may be fixed to each other by a fastening member, or may be fixed by using the adhesion part 32e together with the fastening member. The first and second case units 32c and 32d may be fixed by various methods other than those methods.

The case 32 may comprise various materials which can maintain an external shape or an outer peripheral surface, and can protect various components, articles, members, and the like positioned inside the case 32. For example, the case 32 may be comprised of various materials including a resin, a metal, a surface-treated metal (or a coated metal), etc. Accordingly, the case 32 may be comprised of materials which have optical transmittance or materials which do not have optical transmittance depending on constituent materials.

In the present embodiment, the case 32 includes a fastening part 322c for fixing the air discharge member 60. The fastening part 322c may be protruded to the inside of the case 32 while having a through-hole through which a fixing unit 62 passes. The through-hole may have an engagement structure 322d on an inner surface thereof through which the fixing unit 62 passes, and the through-hole having the engagement structure 322d may be formed as, for example, a burring hole with a burring structure. Such a through-hole may have a smaller size than a second through-hole 32b through which an output cable 36 passes.

In the present embodiment, the case 32 may include a fastening unit 320 for fixing with the frame 20. The fastening unit 320 is a part which is coupled to the frame 20 by fastening members 38. In the present embodiment, the fastening unit 320 may be integrally formed on the case 32 so that the fastening unit 320 forms at least a portion of the case 32. In that case, a case 32 having a desired structure without a separate process can be manufactured by forming the case 32 including the fastening unit 320.

The fastening unit 320 may be extended from a portion of the case 32 (an upper end portion of the case 32 in the drawing) adjacent to the frame 20 so that the fastening unit 320 may come into contact with at least one surface of the frame 20 (particularly, the second part 244 of the frame 20). In that case, the case 32 may be fixed to the frame 20 by forming fastening holes 320a and 244a in the fastening unit 320 and the second part 244, and fastening the fastening members 38 (for example, screws or the like) to the fastening holes 320a and 244a. Accordingly, the case 32 and the frame 20 may be solidly fixed by a simple structure.

For example, the fastening unit 320 in the present embodiment includes a fastening part 322 fastened to the second part 244 of the frame 20. And, the fastening unit 320 may include an extension part 324 connected from the fastening part 322 to the case 32 (for example, the first case unit 32c). The extension part 324 may include a first extension part which is bent from the fastening part 322 and extended toward the solar cell panel 10, a second extension part which is bent from the first extension part and extended to have a surface parallel to the solar cell panel 10, and a third extension part which is bent from the second extension part, extended to the rear of the solar cell panel 10, and extended to the first case unit 32c.

At least a portion of the fastening part 322 may be positioned to come into contact (or closely contact) with the second part 244 of the frame 20. For example, the fastening unit 320 may be positioned in an internal space of the extension unit 24 by positioning the fastening part 322 so that the fastening part 322 is closely contacted with an inner surface (i.e., a rear surface portion 226 or a face facing the solar cell panel 10) of the second part 244. At this time, fastening holes 244a and 320a are positioned at corresponding positions of the fastening part 322 which is closely contacted with the second part 244 and the inner surface of the second part 244. Also, catching units 320b passing through catching grooves 244b of the second part 244 may be formed on side edges of the fastening part 322. In that case, the fastening unit 320 and the second part 244 may be fixed to each other by the fastening members 38 after inserting the catching units 320b of the fastening part 322 into the catching grooves 244b of the second part 244, thereby adjusting the fastening unit 320 to a desired position of the second part 244. In the present embodiment, the catching units 320b may be formed as protrusions protruding in a direction away from the solar cell panel 10 so that the catching units 320b pass through the second part 244, and the catching grooves 244b may be formed as grooves which are formed correspondingly to portions of the second part 244 at which the catching units 320b are positioned. Accordingly, positions of the fastening unit 320 and the second part 244 may be easily adjusted by using a simple structure. Furthermore, alignment properties may be further improved by positioning each of the catching units 320b on both side edges of the fastening part 322, and positioning two of the catching grooves 244b correspondingly to the catching units 320b. However, the present disclosure is not limited thereto. Therefore, a fastening structure of the frame 20, and structures, shapes, positions, numbers, and the like of the catching units 320b and the catching grooves 244b can be variously changed.

The fastening unit 320 bent multiple times may be more easily processed by forming through-holes 320c along the first extension part and the second extension part. Although a plurality of the through-holes 320c may be formed to improve processing easiness, the present disclosure is not limited thereto. Furthermore, shapes, sizes, and the like of the through-holes 320c are not greatly limited.

The fastening unit 320 may have a high strength as the fastening unit 320 can act as a reinforcing member when forming the fastening unit 320 by bending the first to third extension parts besides the fastening part 322 several times as stated above. Accordingly, a part of the case 32 fastened to the frame 20 may have sufficient strength. In addition, if the first to third extension parts are provided, a space of which one side is opened is defined by the first to third extension parts. That is, three faces of an internal space may be surrounded by the first to third extension parts, and a space between the third extension part and the fastening part 322 (i.e., a space positioned in the front of the second extension part) may be opened by forming a U- or □-character shape by the first to third extension parts. Accordingly, the space defined by the first to third extension parts may provide a space through which a trunk cable (not shown in the drawings) connected to the outside (e.g., other solar cell module 100 or power grid) passes, to which the trunk cable is suspended, or in which the trunk cable is positioned.

The above-mentioned case 32 may be fixed to the rear surface of the solar cell panel 10 by the adhesion member 30a. For example, the adhesion member 30a may surround a first through-hole 32a, and has a closed space therein so that the adhesion member 30a may isolate an internal space of the adhesion member 30a from the outside. The adhesion member 30a may include various materials with excellent adhesive properties, sealing properties, and other properties. For example, the adhesion member 30a may include a sealant and the like. However, the present disclosure is not limited thereto. Therefore, it is possible to make various modifications including forming the adhesion member 30a in a structure formed of resin, metal, or the like, thereby bonding the case 32 and the solar cell panel 10 using heat or the like.

In addition to this, the distributing box 30 may be more solidly fixed by additionally fixing the fastening unit 320 to the frame 20 in the present embodiment. However, the present disclosure is not limited thereto, and it may be also possible that the fastening unit 320 is not additionally fixed to the frame 20 as the case 32 does not include the fastening unit 320. Furthermore, the case 32 and the solar cell panel 10 may be fixed by other coupling structures (for example, screw coupling, latching structure, and packing structure). Various modifications other than those are possible.

The circuit unit 34 may include at least one of a terminal 342, a bypass diode 344, an inverter member 346, and a circuit board 348. The terminal 342 may receive electrical energy generated by the solar cell panel 10 as a conductive connecting material 122 is connected to the terminal 342. The bypass diode 344 may provide a detour route when some of the solar cells 12 are not operated. The inverter member 346 may convert a direct current (DC) voltage into an alternating current (AC) voltage, or convert a DC or AC voltage with a predetermined level into a DC or AC voltage with other level. Particularly, the inverter member 346 may include a DC/AC inverter converting a DC voltage generated in the solar cell panel 10 into an AC voltage, and may include a DC-DC converter converting a current into other DC of a predetermined level, a capacitor storing a current passing through the bypass diode 344 to provide a current of a predetermined voltage to the DC-DC converter, and the like.

The circuit board 348 may enable various components, members, circuits, or others (e.g., the terminal 342, the bypass diode 344, the inverter member 346, and the like) positioned inside the distributing box 30 to be fixed, and/or electrically connected to one another. The terminal 342, the bypass diode 344, and the inverter member 346 may be connected by a circuit pattern formed on the circuit board 348. The circuit unit 34 may include various components, articles, wirings, and the like in addition to the terminal 342, the bypass diode 344, the inverter member 346, and the circuit board 348.

It has been exemplified in the present embodiment that the terminal 342, the bypass diode 344, the inverter member 346, and the circuit board 348 are provided inside one case 32 by allowing a distributing box 30 to have an integrated structure so that the distributing box 30 includes at least a portion of a conventional junction box and at least a portion of an inverter. Such a distributing box 30 may be named as an integrated inverter, a junction box integrated inverter, a bypass diode integrated inverter, an integrated junction box, an inverter integrated junction box, or the like.

Accordingly, a structure for connecting the solar cells 12 and the outside (e.g., other solar cell module 100 or power grid) may be provided together in the distributing box 30. More specifically, the case 32 may be provided with a first through-hole 32a through which a conductive connection material 122 for connection with the solar cells 12 passes, and a second through-hole 32b through which one AC output cable 36 transmitting an AC voltage generated by the distributing box 30 passes. Accordingly, structure and installation process of the distributing box 30 may be simplified, and damages or the like which may be occurred by the DC cables can be prevented by removing existing two DC output cables for connecting a junction box and an inverter. Therefore, structure of a solar cell module 100 can be simplified, and stability of the solar cell module 100 can be improved.

An insulation coating layer 348a may be formed on a circuit board 348. More specifically, an insulation coating layer 348a may be positioned on the circuit board 348, and on a terminal 342 and an inverter member 346 which are positioned on the circuit board 348. Such an insulation coating layer 348a may have a thickness of 1 mm or less, and the insulation coating layer 348a may comprise a resin such as an epoxy resin, a silicone resin, or the like, or an insulating material. As such an insulation coating layer 348a is positioned only on a portion where the circuit board 348 is positioned, the insulation coating layer 348a is different from a potting material, a potting member, or the like which is formed as a whole even on a portion where the circuit board 348 is not provided. Accordingly, the residual empty space SP may be positioned in a space where the circuit unit 34 is not positioned inside the case 32. Namely, as a portion of the circuit unit 34 or the insulation coating layer 348a is spaced apart from the case 32, the residual empty space SP may be formed therebetween.

That is, according to the present embodiment, a process of fastening or assembling circuits, members, components, and the like to the inside of the distributing box 30, and filling a potting material is omitted so that the residual empty space SP in which air may be positioned is provided inside the distributing box 30. Accordingly, productivity may be greatly improved since weight of the distributing box 30 may be reduced, a filling process, a coagulation process, and the like of the potting material are omitted, and a structure for reducing the weight of the distributing box 30 may be removed from the distributing box 30. Furthermore, the circuit board 348 may be stably protected, and desired insulation properties of the circuit board 348 may be satisfied by forming the insulation coating layer 348*a* including the resin or the insulating material on the surface of the circuit board 348 positioned inside the distributing box 30.

For example, a volume ratio of the residual empty space SP to the internal space of the case 32 may be 10% or more, and excellent effects according to the present embodiment may be exhibited when the volume ratio of the residual empty space SP to the internal space of the case 32 is, for example, 50% or more.

And, the air discharge member 60 may be positioned on the distributing box 30. At this time, the air discharge member 60 is directly connected to the residual empty space SP to enable the residual empty space SP to be directly connected to the outside. For example, the air discharge member 60 may be fixed to an upper end portion of the side surface of the case 32 (more specifically, a first case unit 32*c*) of the distributing box 30 in the present embodiment. In that case, as the air discharge member 60 is positioned in a space which doesn't stand out in the eyes of a user or an outsider, and is out of reach thereof, a problem such as separation of the air discharge member 60 or damage to the air discharge member 60 due to fun, mistake, or the like can be minimized. In addition, the air discharge member 60 may allow hot air inside the case 32 to easily move through an upper end of the case 32. However, the present disclosure is not limited thereto. Therefore, the air discharge member 60 may be positioned at various positions such as an upper end, a side end, a lower end, and the like of the first and second case units 32*c* and 32*d*.

For example, the air discharge member 60 may be fixed by passing through a through-hole of a fastening part 322*c* of the case 32 (for example, a second case unit 32*d*). Accordingly, the air discharge member 60 may be stably fixed by a simple process. This will be described in more detail after specifically explaining structure of the air discharge member 60.

The air discharge member 60 may include a membrane 64 having pores 64*a*, and may further include a fixing unit 62 fixed to the case 32, and a cover unit 66 fixed to the fixing unit 62 to have an air flow path 66*c* in a state that the membrane 64 is formed between the cover unit 66 and the fixing unit 62.

The fixing unit 62 may include a fixing part 62*a* which has a larger size than a through-hole of the fastening part 322*c* of the case 32, and is positioned outside the case 32, and an extension part 62*b* which is extended to the inside of the case 32 by passing through the through-hole.

When it is seen as a plan view, the extension part 62*b* may have a shape which is extended from the inside of the case 32 to the outside thereof while having a size or diameter that is the same as or smaller than that of the through-hole, and the fixing part 62*a* is extended from an outer portion of the extension part 62*b* so that the fixing part 62*a* may have a larger size or diameter than the through-hole. An engagement structure 620 (for example, a screw thread or a tapping structure) or the like which is engaged with the engagement structure 322*d* so that the engagement structure 620 is engaged with an engagement structure 322*d* may be formed on an outer surface of the extension part 62*b*. If screw-type engagement structures 322*d* and 620 are provided accordingly, separate nut components are not required, and the air discharge member 60 may be fastened by a simple and easy process of screw-fastening the fixing unit 62 to the fastening part 322*c*. Accordingly, as the fastening process can be performed by the air discharge member 60 itself, the air discharge member 60 is advantageous to weight lightening and production efficiency. At this time, fixing stability of the air discharge member 60 may be further improved by forming the extension part 62*b* so that the extension part 62*b* is more protruded than the fastening part 322*c* inside the case 32.

The extension part 62*b* may have an air flowing central hole provided therein, and the fixing unit 62 may further include a cap unit 62*c* which closes the end portion of the extension part 62*b* so that an air outlet 62*d* is formed in an end portion of the extension part 62*b* positioned outside adjacently to the fixing part 62*a*. Such a cap unit 62*c* having the air outlet 62*d* may block again that moisture, dust, or the like undesirably flows in from the outside by forming an air flowing path in a curved shape. A hooking protrusion 622 to which the cover unit 66 is fixed may be formed on the fixing part 62*a*. The fixing unit 62 including the fixing part 62*a*, the extension part 62*b*, and the cap unit 62*c* having the air outlet 62*d* may be provided with a single body formed together by one process.

The membrane 64 may be mounted on a portion of the fixing unit 62 which is positioned outside the case 32. The membrane 64 may have a filter structure having small pores 64*a*. Since the membrane 64 has pores 64*a* having a size smaller than water drop or dust and larger than air molecule, the membrane 64 prevents water, dust, or the like of the outside from flowing into the inside of the membrane 64 while allowing air inside the membrane 64 and air outside the membrane 64 to flow to each other. For example, when the pores 64*a* of the membrane 64 has a size of 1, the air molecule may have a relative size corresponding to about a seven hundredth, and the water drop may have a relative size corresponding to about 20,000. Although pores 64*a* which have a predetermined shape and are regularly positioned have been exemplified in the drawing, shape, structure, and the like of the pores 64*a* can be variously changed.

As the cover unit 66 includes a front end part 66*a* which is formed to be parallel to the membrane 64 and forms a front end portion, and a plurality of extension parts 66*b* which are partially extended from the front end part 66*a* toward the fixing unit 62, the air flow path 66*c* may be formed between the plurality of extension parts 66*b*. As a hooking unit 662 which is hooked to the hooking protrusion 622 is provided on the extension parts 66*b*, the extension parts 66*b* may be easily and simply fixed to the fixing unit 62. However, the present disclosure is not limited thereto.

The fixing unit 62 and/or the cover unit 66 may be an injection-molded product which is formed by injecting resin and comprises the resin. In that case, the fixing unit 62 and/or the cover unit 66 are/is lightweight, may be easily manufactured, and are/is cheap in price. The case 32 may be metal or resin. After separately manufacturing the fixing unit 62, membrane 64, and cover unit 66, the separately manufactured fixing unit 62, membrane 64, and cover unit 66 may be assembled and fixed to the case 32. For another example, when the case 32 is resin, a single body having a structure in which the fixing unit 62 and the case 32 are integrated may be formed by forming the case 32 and the fixing unit 62 through a single injection process. In that case, the air discharge member 60 may be formed by assembling the membrane 64 and the cover unit 66 into the fixing unit 62.

When a pressure is applied between the fixing part 62a and the distributing box 30 (i.e., between an inner surface of the fixing part 62a and an outer surface of the distributing box 30), a close contact member 68 blocking a gap while it is being deformed may be provided. Accordingly, sealing properties may be improved by additionally sealing the air discharge member 60 and the case 32. Although the close contact member 68 may have a circular flat surface shape surrounding the extension part 62b, the present disclosure is not limited thereto. The close contact member 68 may include an O-ring, and may be formed of rubber, resin, etc.

According to the present embodiment, air due to the residual empty space SP inside the distributing box 30 may be discharged by the air discharge member 60 when temperature of the distributing box 30 is increased while operating the solar cell module 100 or the distributing box 30. In that case, air pressure equilibrium inside and outside the distributing box 30 may be achieved while an internal air and an external air are exchanged with each other through the membrane 64 even when air in the residual empty space SP is expanded or when pressure in the residual empty space SP is increased by heat generated from the distributing box 30 due to the circuit unit 34, the circuit board 348, or the like when the solar cell module 100 is operated. Accordingly, the distributing box 30 may be prevented from being undesirably deformed. The air discharge member 60 includes the membrane 64 so that the membrane 64 may prevent moisture, dust, or the like of the outside from flowing into the distributing box 30 while a flow of air inside and outside the distributing box 30 is not being blocked.

In the present embodiment as described above, the terminal 342, bypass diode 344, inverter member 346, and circuit board 348 are positioned together inside one distributing box 30 to simplify installation process and structure. However, the present disclosure is not limited thereto, and the distributing box 30 may mean all configurations which are provided with at least one of the terminal 342, bypass diode 344, and inverter member 346 while including the circuit board 348. For example, the distributing box 30 may be separately provided with a junction box provided with the terminal 342 and/or the bypass diode 344 connected to the conductive connecting material 122 of the solar cell panel 10, and an inverter box including the inverter member 346, and at least one of the junction box and the inverter box may be provided with the aforementioned air discharge member 60. The distributing box 30 may include a power optimizer, a module level power electronics (MLPE), etc., and at least thereof may be provided with the air discharge member 60 as described above. However, the present disclosure is not limited thereto. Accordingly, the distributing box 30 of the present embodiment may perform only at least a partial role of the junction box, or may perform only at least a partial role of a microinverter.

Features, structures, effects, and the like according to the foregoing description are included in at least one embodiment of the present disclosure, and are not necessarily limited to only one embodiment. Furthermore, features, structures, effects, and the like exemplified in respective embodiments can be implemented in a combined or modified form with respect to other embodiments by those skilled in the art to which the embodiments pertain. Accordingly, contents related to such a combination or modification should be construed as falling within the scope of the present disclosure.

The invention claimed is:

1. A solar cell module including:
a solar cell panel;
a frame positioned around an outer peripheral portion of the solar cell panel having an extension unit adjacent to an upper end portion of the solar cell panel; and
a distributing box electrically connected to the solar cell panel and mounted on the upper end portion of the rear side of the solar cell panel by the extension unit of the frame,
wherein the distributing box includes a circuit unit including a circuit board, a case accommodating the circuit unit and having a residual empty space beside the circuit unit and consisting of air, and an air discharge member mounted on the case, connecting the residual empty space to the outside, to enable the air to flow inside and outside the residual empty space,
wherein the air discharge member comprises:
a fixing unit having a portion outside the case that is fixed from a side surface of the case to an upper end portion of the case,
a cover unit fixed to the fixing unit and positioned outside the case, and
a membrane having pores that is mounted on a position of the fixing unit and formed between the fixing unit and the cover unit,
wherein the cover unit comprises a front end part formed to be parallel to the membrane and a plurality of extension parts that are partially extended from the front end part toward the fixing unit, such that an air flow path is formed between the plurality of extension parts,
wherein the fixing unit includes a fixing part having an extension part which is extended to the inside of the case by passing through a through-hole, which is a burring hole in the case, and an engagement structure, which is engaged with an inner surface of the through-hole and an outer surface of the extension part,
wherein a close contact member is positioned between the case and the fixing unit, surrounding the extension part, to block a gap while being deformed.

2. The solar cell module of claim 1, wherein the air discharge member blocks supply of water while enabling the air to flow.

3. The solar cell module of claim 1, wherein the case includes a fastening part that is protruded inwardly while including the through-hole through which the fixing unit passes, the fixing part which has a larger size than the through-hole, is positioned on an outer portion of the case, and has a central hole.

4. The solar cell module of claim 3, wherein a cap unit covering the end portion of the extension part is provided so that an air outlet is formed in an end portion of the extension part adjacent to the fixing part.

5. The solar cell module of claim 1, wherein the distributing box further includes an insulation coating layer positioned on the circuit board.

6. The solar cell module of claim 5, wherein the insulation coating layer has a thickness of 1 mm or less.

7. The solar cell module of claim 5, wherein the insulation coating layer comprises an epoxy resin or a silicone resin.

* * * * *